US009673673B2

(12) United States Patent
Sheppard et al.

(10) Patent No.: US 9,673,673 B2
(45) Date of Patent: *Jun. 6, 2017

(54) MOTOR AIR FLOW COOLING

(71) Applicant: AeroVironment, Inc., Monrovia, CA (US)

(72) Inventors: Lindsay Aspinwall Sheppard, Azusa, CA (US); Bart Dean Hibbs, Simi Valley, CA (US)

(73) Assignee: AeroVironment, Inc., Monrovia, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/076,171

(22) Filed: Nov. 9, 2013

(65) Prior Publication Data
US 2014/0145529 A1   May 29, 2014

Related U.S. Application Data

(63) Continuation of application No. 12/565,715, filed on Sep. 23, 2009, now Pat. No. 8,604,652.

(Continued)

(51) Int. Cl.
*H02K 9/00* (2006.01)
*H02K 3/14* (2006.01)
(Continued)

(52) U.S. Cl.
CPC ............... *H02K 3/14* (2013.01); *H02K 3/30* (2013.01); *H02K 3/32* (2013.01); *H02K 3/47* (2013.01); *H02K 7/14* (2013.01); *H02K 9/02* (2013.01); *H02K 9/06* (2013.01); *H02K 9/14* (2013.01); *H02K 9/22* (2013.01); *H02K 16/02* (2013.01);
(Continued)

(58) Field of Classification Search
CPC .................................. H02K 9/00; H02K 9/06
USPC .............. 310/52–55, 58–59, 60 A, 60 R, 61; 29/596, 598
See application file for complete search history.

(56) References Cited

U.S. PATENT DOCUMENTS 3,648,090 A    3/1972  Voin
2001/0035651 A1*  11/2001  Umemoto ............... F03D 11/00
                                                   290/44

(Continued)

FOREIGN PATENT DOCUMENTS

EP    1641101 A1    3/2006
EP    1843447 A1   10/2007
(Continued)

OTHER PUBLICATIONS

Japan Patent Office (JPO) Office Action (OA) for corresponding Japanese Patent Application No. 2011-529200 Entitled Motor Air Flow Cooling by Sheppard et al.; Issued Jan. 27, 2014 from Japan Patent Office, 4 pgs.

(Continued)

*Primary Examiner* — Jose Gonzalez Quinone
(74) *Attorney, Agent, or Firm* — Christopher R. Balzan; Eric J. Aagaard

(57) ABSTRACT

In one possible embodiment, an aircraft electric motor cooling system is provided having an airflow path through a spinner which includes a first airflow path between an inner rotor and a stator, a second airflow path between an outer rotor the stator and a third airflow path along an outer surface of the outer rotor.

20 Claims, 5 Drawing Sheets

Related U.S. Application Data

(60) Provisional application No. 61/194,098, filed on Sep. 23, 2008, provisional application No. 61/194,099, filed on Sep. 23, 2008, provisional application No. 61/194,056, filed on Sep. 23, 2008.

(51) Int. Cl.
    *H02K 3/47*     (2006.01)
    *H02K 7/14*     (2006.01)
    *H02K 16/02*    (2006.01)
    *H02K 9/06*     (2006.01)
    *H02K 9/14*     (2006.01)
    *H02K 9/02*     (2006.01)
    *H02K 9/22*     (2006.01)
    *H02K 3/30*     (2006.01)
    *H02K 3/32*     (2006.01)
    *H02K 21/12*    (2006.01)

(52) U.S. Cl.
    CPC ............ *H02K 21/12* (2013.01); *Y02E 10/725* (2013.01); *Y10T 29/49009* (2015.01)

(56) References Cited

U.S. PATENT DOCUMENTS

| | | | |
|---|---|---|---|
| 2004/0145246 A1 | 7/2004 | Nakano et al. | |
| 2006/0091743 A1 | 5/2006 | Iwasaki et al. | |
| 2006/0284511 A1 | 12/2006 | Evon et al. | |
| 2007/0024132 A1* | 2/2007 | Salamah et al. | 310/64 |
| 2007/0108865 A1 | 5/2007 | Jansen et al. | |
| 2007/0222223 A1* | 9/2007 | Bagepalli et al. | 290/55 |
| 2008/0174194 A1 | 7/2008 | Qu et al. | |

FOREIGN PATENT DOCUMENTS

| | | |
|---|---|---|
| GB | 105051 A | 12/1916 |
| JP | 53086404 A | 7/1978 |
| JP | 10127013 A * | 5/1998 |

OTHER PUBLICATIONS

State Intellectual Property Office of China (SIPO) Office Action (OA) for Chinese Patent Application No. 200980146819.6 Entitled Motor Air Flow Cooling by Sheppard et al.; Issued Jul. 23, 2013 from State Intellectual Property Office, 7 pgs.

State Intellectual Property Office of China (SIPO) Office Search Report for Chinese Patent Application No. 200980146819.6 Entitled Motor Air Flow Cooling by Sheppard et al.; Issued Jul. 23, 2013 from State Intellectual Property Office, 1 pg.

Australian Government IP Australia, Examiner's First Report for corresponding Australia case application No. 2009296686 entitled Motor Air Flow Cooling by Sheppard et al., Sep. 23, 2009, Australian Government Intellectual Property Australia, Sep. 16, 2011, 2 pgs.

International Searching Authority(ISA); International Search Report (ISR) for corresponding PCT case application No. PCT/US2009/058120 entitled Motor Air Flow Cooling by Sheppard et al.; mailed Dec. 23, 2011 from US International Searching Authority; 2 pgs.

International Searching Authority (ISA); Written Opinion of the International Searching Authority (WO) for corresponding PCT case application No. PCT/US2009/058120 entitled Motor Air Flow Cooling by Sheppard et al.; mailed Dec. 23, 2011 from US International Searching Authority; 7 pgs.

International Searching Authority (ISA); Examiner's Search History for corresponding PCT case application No. PCT/US2009/058120 entitled Motor Air Flow Cooling by Sheppard et al.; mailed Dec. 23, 2011 from US International Searching Authority; 3 pgs.

European Patent Office (EPO); Supplementary European Search Report (ESR); and Annex to the ESR for corresponding European case application No. EP 09 81 6819 entitled Motor Air Flow Cooling by Sheppard et al.; mailed Dec. 13, 2012 from European Patent Office; 7 pgs.

Hungarian Intellectual Property Office (HIPO); Written Opinion (WO) for corresponding case Singapore application No. 201104423-7 entitled Motor Air Flow Cooling by Sheppard et al.; mailed Aug. 17, 2012 from Hungarian Intellectual Property Office; 6 pgs.

Hungarian Intellectual Property Office (HIPO); Search Report; and Annex for corresponding case Singapore application No. 201104423-7 entitled Motor Air Flow Cooling by Sheppard et al.; mailed Aug. 17, 2012 from Hungarian Intellectual Property Office; 7 pgs.

Machine Translation JP10127013 (1998).

Korean Intellectual Property Office (KIPO); First Office Action (1OA) for corresponding case Korea application No. 10-2011-7009311 entitled Motor Air Flow Cooling by Sheppard et al.; mailed Nov. 13, 2015 from Korean Intellectual Property Office; 9 pgs.

\* cited by examiner

MOTOR AIR FLOW COOLING

CROSS REFERENCE RELATED PATENT APPLICATIONS

The present application is a continuation of U.S. application Ser. No. 12/565,715, filed Sep. 09, 2009, by Sheppard et al., entitled MOTOR AIR FLOW COOLING, issued as U.S. Pat. No. 8,604,652 on Dec. 10, 2013, herein incorporated by reference in its entirety, which claims the benefit of the following applications which are all herein incorporated by reference in their entireties:

U.S. Provisional Application No. 61/194,098, filed Sep. 23, 2008, by Daboussi, entitled WINDING DESIGN FOR IRONLESS P.M. MOTOR;

U.S. Provisional Application No. 61/194,099, filed Sep. 23, 2008, by Daboussi et al., entitled PROPELLER DRIVE UNIT FOR HALE UAV; and U.S. Provisional Application No. 61/194,056, filed Sep. 23, 2008, by Hobbs, entitled FLUX CONCENTRATOR FOR IRONLESS MOTORS.

The present application is also related to the following applications, which are hereby incorporated by reference in their entireties:

U.S. Non-provisional Application No. 12/565,705, filed Sep. 23, 2008, entitled COMPRESSED MOTOR WINDING, by Daboussi et al;

U.S. Non-provisional Application No. 12/565,710, filed Sep. 23, 2008, entitled STATOR WINDING HEAT SINK CONFIGURATION, by Daboussi et al; and U.S. Non-provisional Application No. 12/565,718, filed Sep. 23, 2008, entitled FLUX CONCENTRATOR FOR IRONLESS MOTORS, by Hobbs.

BACKGROUND

Electric motors for vehicles need to have high efficiency to conserve power. Furthermore, in unmanned aerial vehicles, light weight and compact electric motors are also desirable. Thus, ironless motors are often used which can provide the benefit of no iron losses due to changing flux direction.

Motors are normally rated for the peak power and efficiency of the motor. In some applications, high part load efficiency is desired, which is high efficiency when machine is loaded at a partial load, i.e. 15% or some other percent.

What is needed is a higher efficiency compact motor.

SUMMARY

In one possible embodiment, an aircraft electric motor cooling system is provided having an airflow path through a spinner which includes a first airflow path between an inner rotor and a stator, a second airflow path between an outer rotor the stator and a third airflow path along an outer surface of the outer rotor.

In various embodiments, the first airflow path extends along inner rotor magnets and/or the second airflow path extends along outer rotor magnets. In various embodiments, the first airflow path extends along a front stator yoke and along a rear stator yoke and/or the second airflow path extends along a front stator yoke and a rear stator yoke.

In various embodiments, the second and third airflow paths extend through a rear stator heat sink along with an air stream path. In various embodiments, the airflow path extending through the spinner comprises a portion extending through front stator cooling fins, and wherein the second and third portion are derived at least in part from the front stator cooling fins portion.

Other embodiments are also provided.

BRIEF DESCRIPTION OF THE DRAWINGS

The features and advantages of the present invention will be better understood with regard to the following description, appended claims, and accompanying drawings where:

DESCRIPTION

Figure 1:
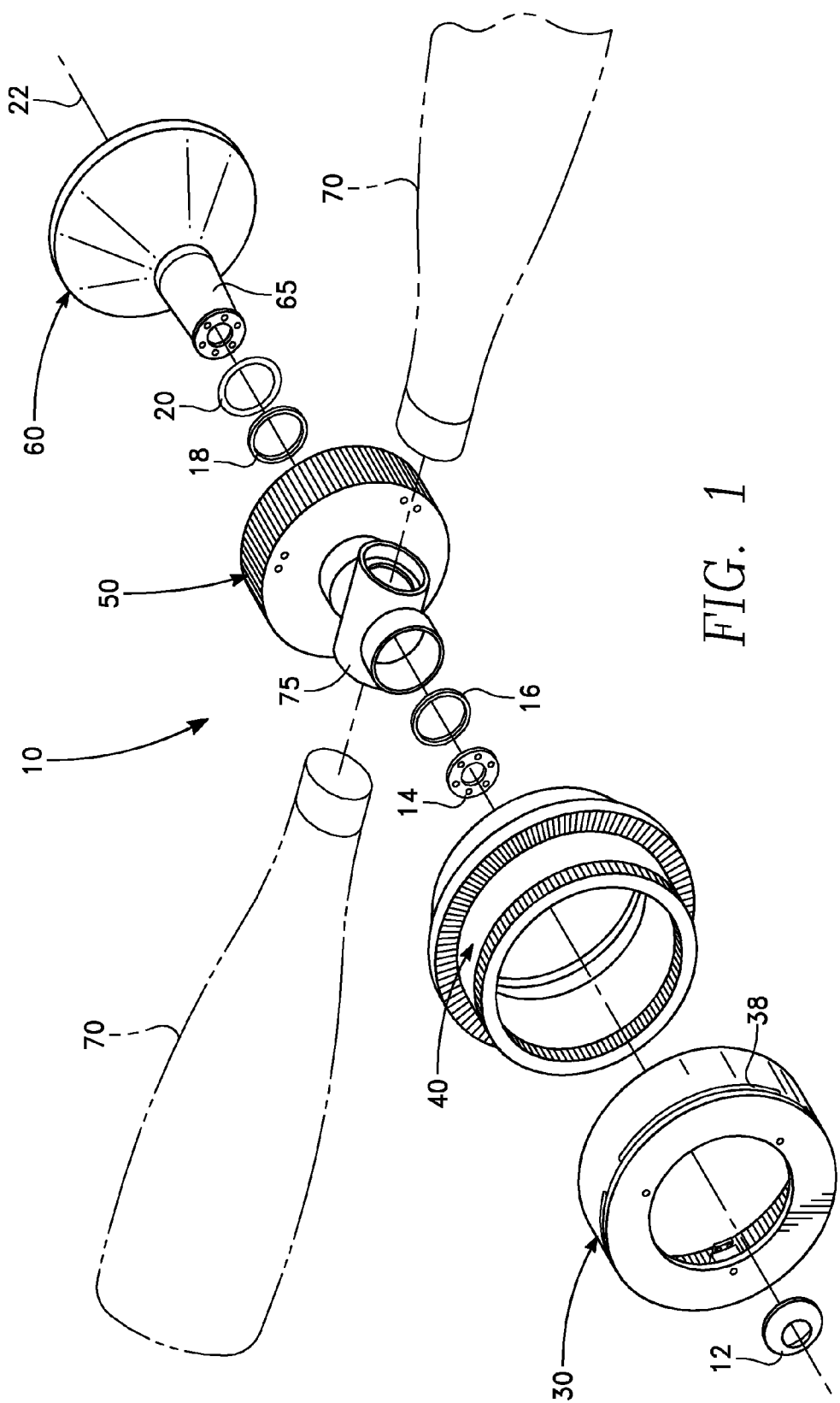
FIG. 1 shows a simplified exploded perspective view of an example motor.

FIG. 1 shows a simplified exploded perspective view of an example motor 10 along axis 22. A stator 40 is secured to a housing 60. Inner rotor 50 and outer rotor 30 are secured to each other and surround the stator 40. An optional propeller hub 75, into which propeller blades 70 are mounted, is secured to the inner rotor 50. The propeller hub 75 rotatable mounts on the shaft 65 with bearings 16 and 18. The bearings 16 and 18 are retained by retainers 20 and 14 and cover 12.

Figure 2:
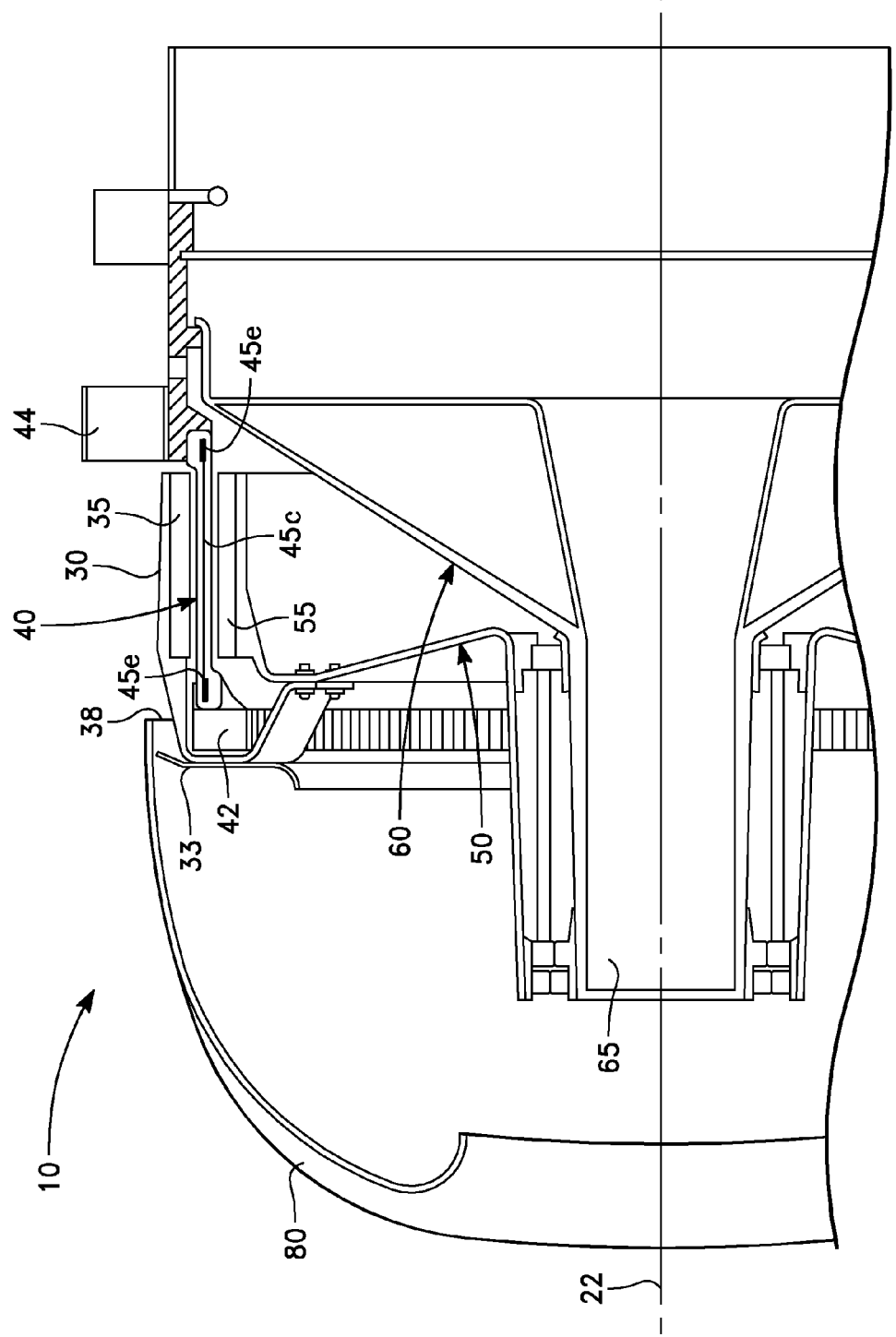
FIG. 2 shows a simplified cross sectional side view of the motor of FIG. 1 along its longitudinal axis.

FIG. 2 shows a simplified cross-sectional side view of the motor 10 of FIG. 1 along its longitudinal axis 22. The stator 40 is located between magnets 35 and 55 of the inner and outer rotors 50 and 30, respectively. The shaft 65 may be fabricated of carbon fiber or other suitable material.

Figure 3:
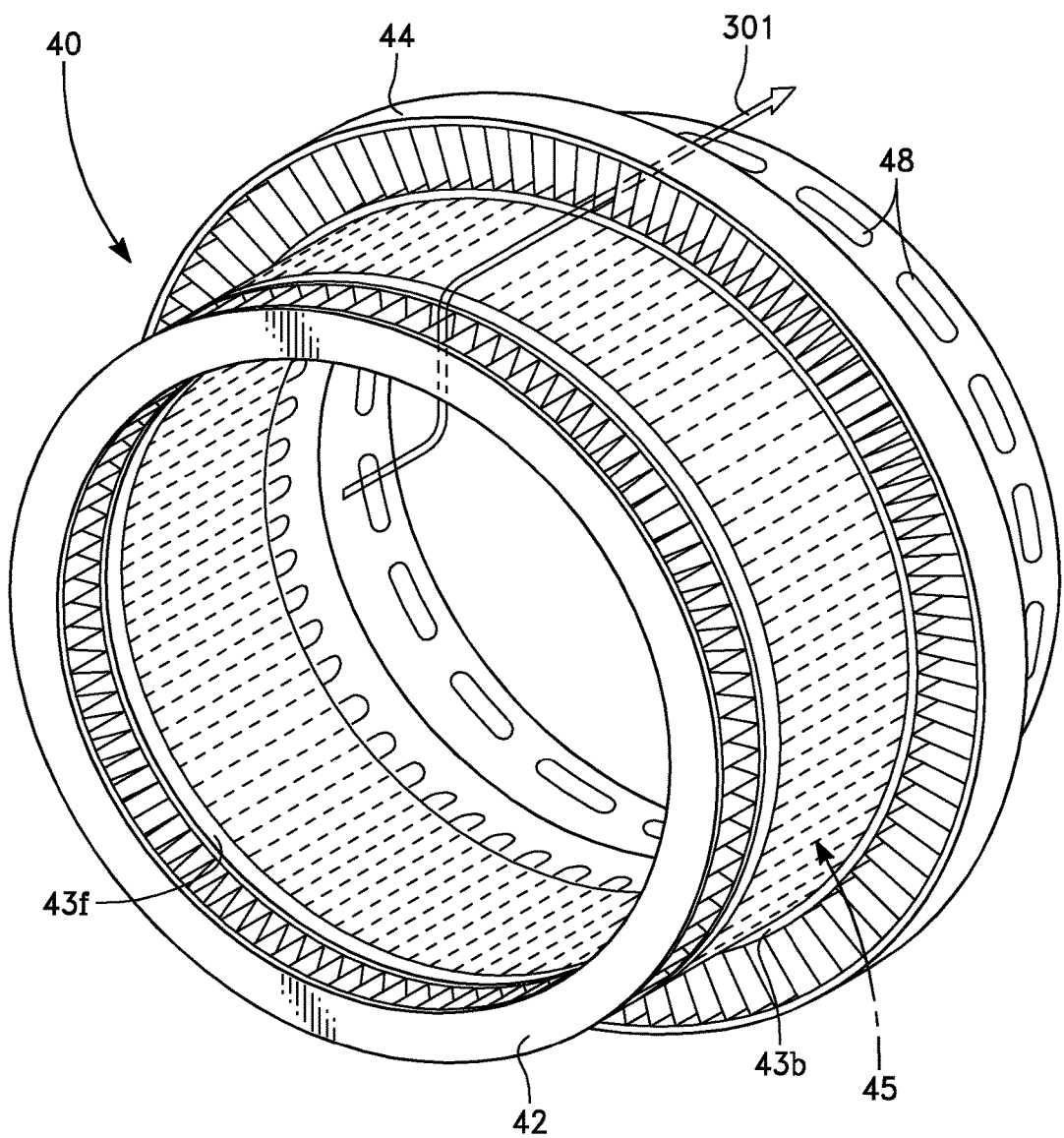
FIG. 3 shows a simplified perspective view of the stator having a winding.

FIG. 3 shows a simplified perspective view of the stator 40 having a winding 45. The winding 45 is encased within the stator 40. Cooling fins 42 and 44 are bonded to the front and back stator yoke portions 43f and 43b, respectively. FIG. 3 shows one air flow cooling path, indicated by the arrow 301, through the cooling fins 42 and 44.

Figure 4:
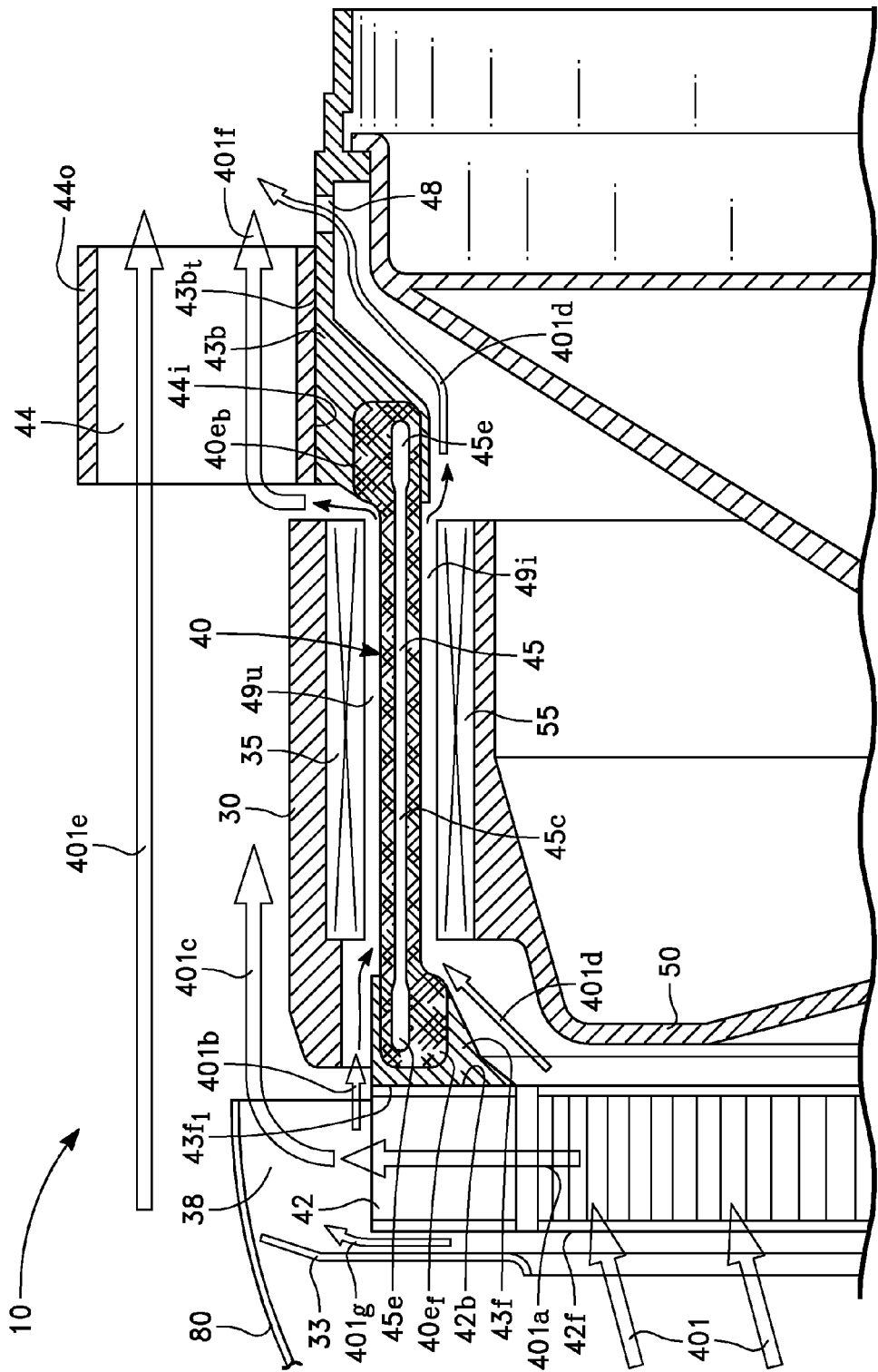
FIG. 4 shows a simplified view along a cross section of the motor of FIG. 2.

FIG. 4 shows a simplified cross section of the motor 10 of FIG. 2. The winding 45 has a compressed central region 45c. The winding 45 is compressed in the central region 45c so that more conductor material of the winding 45 can be placed between the magnets 35 and 55 and so that more conductor can be located closer to the magnets 35 and 55 of the rotors 30 and 50 to provide increased magnetic field strength in the winding 45. In this embodiment, it is not necessary that the ends 45e of the winding 45 also are compressed. This is because the ends 45e of the winding 45 do not pass between the magnets 35 and 55 of the rotors 30 and 50.

In accordance with various embodiments, for both axial and radial ironless P.M. or permanent magnet machines, the winding 45 should have a high packing density to minimize $I^2R$ losses and a construction that minimizes eddy losses. The magnets 35 and 55 in the rotor 40 pass over/under a central active region 45c of the stator winding 45, and not over/under the edges 45e of the stator winding 45. Thus, in various embodiments, the active region 45c of the winding 45 should have as much conductor, i.e. copper, as possible in the volume of the active region 45c.

Also, in various embodiments, the winding 45 should have high rigidity so that the winding 45 does not deflect and contact the magnets 35 or 55, and to adequately withstand the turn-to-turn voltages and associated forces. The winding 45 is enclosed in a suitable material, such as epoxy.

Although shown large for illustration purposes, the air gaps 49$u$ and 49$i$ between the stator 40 and the magnets 35 and 55 are small so that the magnets 35 and 55 provide the maximum magnetic field in the winding 45. The close proximity of the stator 40 with the magnets 35 and 55, however, can facilitate unwanted heat transfer from the stator 40 to the magnets 35 and 55 across the gaps 49$u$ and 49$i$. As excessive heat can damage the magnets 35 and 55, the stator 40 is provided with front and back cooling fins 42 and 44.

Thus, the winding 45 should have a low thermal impedance path to the cooling fins 42 and 44. For most embodiments, the winding 45 is encased in epoxy mixed with a thermally conductive filler such as aluminum oxide, boron nitride, or other material that facilitates heat conduction.

The front stator yoke 43$f$ surrounds the front end 40$e_f$ of the stator 40 on three sides to provide more surface area for heat transfer out of the stator 40 into the front stator yoke 43$f$. Similarly, the back yoke 43$b$ surrounds three sides of the back end 40$e_b$ of the stator.

The cooling fins 42 and 44 may be made of aluminum or other suitable lightweight heat conductive material. The cooling fins 42 and 44 may be formed separately and bonded with a low thermal impedance bond to the stator yokes 43$f$ and 43$b$, or integrally formed with them. Further it is possible in some embodiments that the front end 40$e_f$ of the stator 40 and the back end 40$e_b$ be directly connected to the cooling fins 42 and 44, respectively.

The front cooling fins 42 extend away in a forward direction from the front surface 43$f_i$ of the front stator yoke 43$f$. The front cooling fins 42 are radically oriented with respect to the axis 22 (FIG. 2). The back surface 42$b$ of the cooling fins 42 are bonded to the front surface 43$f_i$ of the front stator yoke 43$f$. The front surface 42$f$ of front cooling fins 42 is solid such that the air flows radically outward through the front cooling fins 42 with respect to the axis 22 (FIG. 2). In another embodiment not shown, the solid front surface 42$f$ is not present. In still another embodiment not shown, the front fins are oriented radically, with air flow axially between them instead of radial air flow. Other configurations are possible.

The rear cooling fins 44 surround the back stator yoke 43$b$ and are radically oriented with respect to the axis 22 (FIG. 2). The rear cooling fins 44 are surrounded by a solid outer ring 44$o$. The inner surface(s) 44$i$, which may be a bent over portions of each of the fins 44, is bonded to the top outer surface 43$b_t$ of the back stator yoke 43$b$. The air flows through the rear cooling fins 44 in a direction generally along an axis parallel with the axis 22 (FIG. 2).

Air flow 401 enters through the optional spinner 80 and cover 33. A small portion 401$d$ of the air flow 401 passes between the inner magnets 55 and the stator 40 through gap 49$i$, cooling both the inner magnets 55 and the stator 40, as well as portions of the front yoke 43$f$ and the back yoke 43$b$, directly by convection. This small portion 401$d$ exits through ports 48 (shown in FIGS. 2-4) in the back stator yoke 43$b$. Most of the air flow 401 passes through the front cooling fins 42 as indicated by air flow arrow 401$a$. After passing through the front cooling fins 42, a small portion 401$b$ of air flow 401$a$ passes between the upper magnets 35 and the stator 40 through the gap 49$u$, cooling both, the outer magnets 35 and the stator 40, as well as portions of the front yoke 43$f$ and the back yoke 43$b$, directly by convection.

A large portion 401$c$ of the air flow 401$b$ is diverted by the cover 33 and the spinner 80 to pass through port 38 (also shown in FIGS. 1 and 2) to flow over the outer rotor 30. Depending on the embodiment, a small portion 401$g$ of the air flow 401 may also flow in front of the front cooling fins 42 and exit through port 38. The large portion 401$c$ combines with the air flow 401$b$ from the upper gap 49$u$ to flow 401$f$ through the rear cooling fin 44, along with airflow 401$e$ entering directly from the air stream adjacent to the spinner 80.

In one embodiment, the combination of the cooling fin size and placement, along with the air flow over and through the components as described herein is such that the magnets are maintained at a temperature below about 70 degree Celsius and the winding is maintained at a temperature below about 80-90 degrees Celsius.

Figure 5:
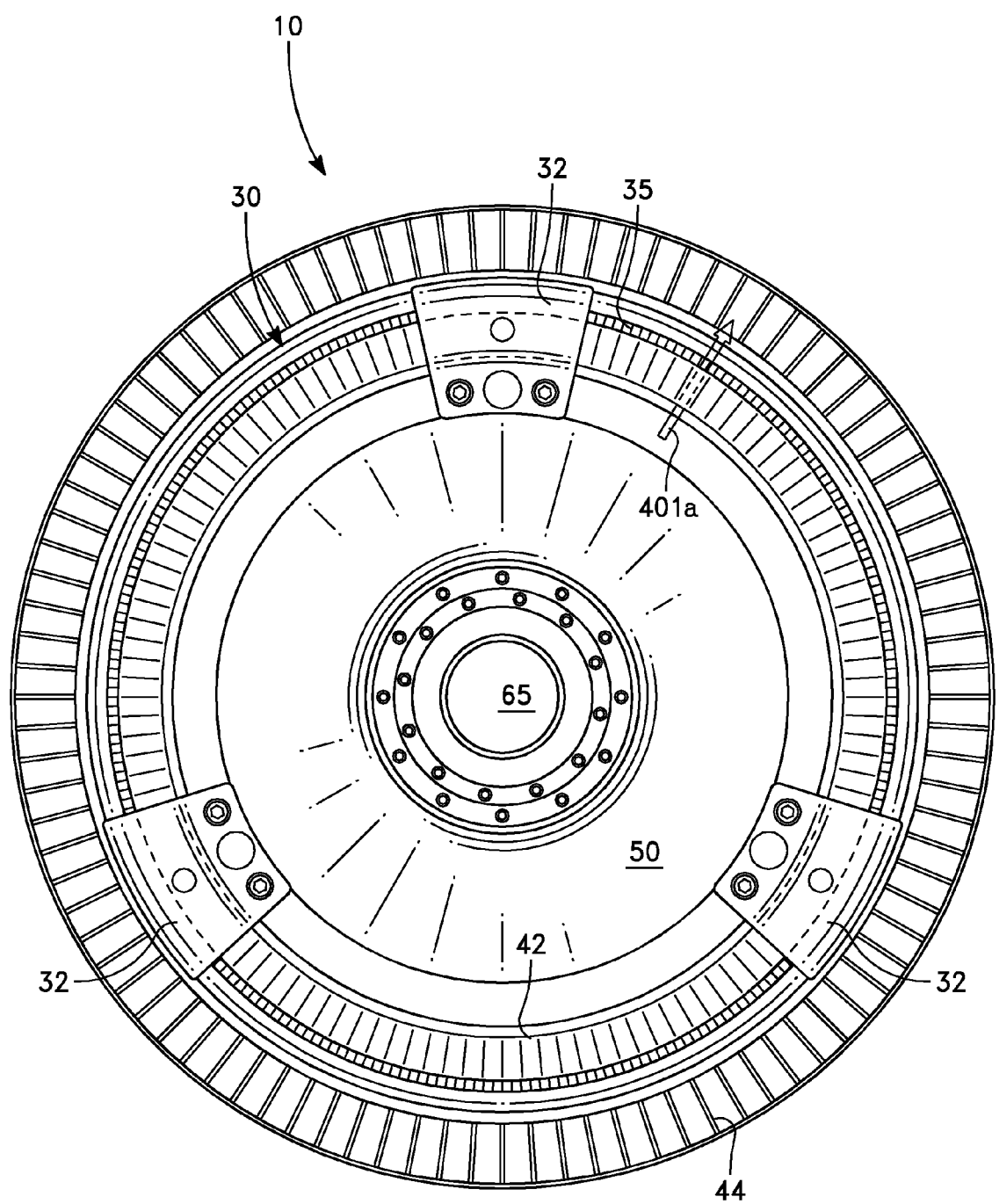
FIG. 5 shows a simplified front view of the motor.

FIG. 5 shows a simplified front view of the motor 10. The inner and outer rotors 50 and 30 are held together in this embodiment with three brackets 32, which also hold on an annular cover 33 (FIGS. 2 and 4). The air flow 401$a$ for the front cooling fins 42 flows through the separations between the three brackets 32. Open area for airflow 401 (FIG. 4) is about 80% of the total available area, the remaining 20% is blocked by the brackets 32. Airflow 401 then flows through the separations, with most of the air flow 401$a$ flowing through the front cooling fins 42. The air flow 401 is slowed by the spinner 80 (FIGS. 2 and 4) and fins 42 so that little flow energy is lost, then re-accelerated to free air stream velocity at port 38.

Although show in the context of aircraft, embodiments of the invention are not limited to aircraft. Further not all parts are required in all embodiments. The above described apparatuses, methods, and systems are not limited to Eaves, or aircraft. Various implementations and/or embodiments may include other motor uses, i.e. auto, industrial, etc. Further in some embodiments, the airflow may be generated, or it may be the result of motion, i.e. flying, driving, etc., of the apparatus or system.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. An aircraft electric motor cooling system comprising:
   a) an airflow path through a spinner comprising:
      i) a first airflow path between an inner rotor and a stator;
      ii) a second airflow path between an outer rotor and the stator; and
      iii) a third airflow path along an outer surface of the outer rotor; and
   b) rear cooling fins thermally coupled to a back end of the stator, wherein the rear cooling fins are sized so as to extend into an air stream of an aircraft.

2. The system of claim 1, wherein the first airflow path extends along inner rotor magnets.

3. The system of claim 2, wherein the second airflow path extends along outer rotor magnets.

4. The system of claim 2, wherein the first airflow path extends along a front stator yoke and along a rear stator yoke.

5. The system of claim 1, wherein the second airflow path extends along outer rotor magnets.

6. The system of claim 5, wherein the second airflow path extends along a front stator yoke and a rear stator yoke.

7. The system of claim 1, wherein the second and third airflow paths extend through the rear cooling fins along with an air stream path.

8. The system of claim 1, further comprising an air stream path extending through the rear stator cooling fins.

9. An electric aircraft motor comprising:
   a) an inner rotor connected with an outer rotor;
   b) a stator comprising a winding located between the inner rotor and the outer rotor;
   c) a spinner; and
   d) a cooling system comprising:
      i) rear cooling fins thermally coupled to a rear portion of the stator, wherein the rear cooling fins extend into an air stream of an aircraft; and
      ii) an airflow path through the spinner comprising:
         (1) a first airflow path between an inner rotor and a stator;
         (2) a second airflow path between an outer rotor the stator; and
         (3) wherein at least a portion of the airflow path through the spinner passes through the rear cooling fins.

10. The motor of claim 9, further comprising:
    a) rear cooling fins thermally coupled to a back end of the stator; and
    b) the airflow path through the spinner extending through the rear cooling fins.

11. The motor of claim 9, wherein the first airflow path extends along inner rotor magnets, and wherein the second airflow path extends along outer rotor magnets.

12. The motor of claim 9, wherein the first airflow path extends along a front stator yoke and along a rear stator yoke.

13. The motor of claim 9, wherein the second airflow path extends along a front stator yoke and a rear stator yoke.

14. A method for air cooling an electric aircraft motor comprising:
    a) passing an air flow through a spinner;
    b) directing a first portion of the air flow to flow between the stator and the inner rotor;
    c) directing a second portion of the air flow to flow between the stator and the outer rotor;
    d) directing a third portion of the air flow to flow along an outer surface of the outer rotor;
    e) passing an air flow from an air stream around the spinner and through rear stator cooling fins; and
    f) directing at least some of the airflow that passes through the spinner, through the rear stator cooling fins.

15. The method of claim 14, wherein the first portion flows along inner rotor magnets.

16. The method of claim 15, wherein the first portion flows along a front stator yoke and along a rear stator yoke.

17. The method of claim 14, wherein the second portion of the air flow flows along outer rotor magnets.

18. The method of claim 17, wherein the second portion flows along a front stator yoke and a rear stator yoke.

19. An aircraft electric motor cooling system comprising:
    a) an airflow path through a spinner comprising:
       i) a first airflow path between an inner rotor and a stator;
       ii) a second airflow path between an outer rotor and the stator;
       iii) a third airflow path along an outer surface of the outer rotor; and
    b) a front heat sink thermally coupled to a front of the stator, the front heat sink comprising fins connected together by a solid front surface;
    c) wherein the airflow path through the spinner comprises a portion passing through the fins of the front heat sink and a portion passing the solid front surface without passing through the fins of the front heat sink.

20. The system of claim 19, wherein the third airflow path comprises portions of the component path passing through the fins of the front heat sink and the component path passing the one of the solid connecting portions.

* * * * *